(12) United States Patent
Hu

(10) Patent No.: US 9,940,021 B2
(45) Date of Patent: Apr. 10, 2018

(54) METHOD AND SYSTEM FOR MEMORY MANAGEMENT AND MEMORY STORAGE DEVICE THEREOF

(71) Applicant: PHISON ELECTRONICS CORP., Miaoli (TW)

(72) Inventor: Chun-Yang Hu, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 117 days.

(21) Appl. No.: 15/000,021

(22) Filed: Jan. 18, 2016

(65) Prior Publication Data

US 2017/0147216 A1 May 25, 2017

(30) Foreign Application Priority Data

Nov. 20, 2015 (TW) .............................. 104138377 A

(51) Int. Cl.
*G06F 12/00* (2006.01)
*G06F 3/06* (2006.01)

(52) U.S. Cl.
CPC ............ *G06F 3/0604* (2013.01); *G06F 3/064* (2013.01); *G06F 3/0632* (2013.01); *G06F 3/0652* (2013.01); *G06F 3/0659* (2013.01); *G06F 3/0679* (2013.01)

(58) Field of Classification Search
CPC ...... G06F 3/0604; G06F 3/064; G06F 3/0652; G06F 3/0659; G06F 3/0679
See application file for complete search history.

(56) References Cited

U.S. PATENT DOCUMENTS

| 8,793,429 | B1 * | 7/2014 | Call | G06F 12/0246 711/103 |
| 2007/0233938 | A1 * | 10/2007 | Cho | G06F 15/177 711/103 |
| 2009/0313420 | A1 * | 12/2009 | Wiesz | G06F 12/0246 711/103 |
| 2011/0047347 | A1 * | 2/2011 | Li | G06F 12/0246 711/209 |
| 2012/0254505 | A1 * | 10/2012 | Chishtie | G06F 12/0246 711/103 |
| 2015/0106556 | A1 * | 4/2015 | Yu | G11C 16/349 711/103 |

(Continued)

*Primary Examiner* — Charles Rones
*Assistant Examiner* — Nanci Wong
(74) *Attorney, Agent, or Firm* — JCIPRNET

(57) ABSTRACT

A method and a system for memory management and a memory storage device thereof are provided. The memory storage device includes a rewritable non-volatile memory module. The method includes receiving a command from a host system; reading use information from the rewritable non-volatile memory module according to the command; writing the use information into a first physical erasing unit of the rewritable non-volatile memory module, and marking the first physical erasing unit with a recognizing flag. The method also includes erasing data in at least part of physical erasing units excepting the first physical erasing unit in the rewritable non-volatile memory module according to the recognizing flag; and establishing a memory management table according to the use information stored in the first physical erasing unit for operating the memory storage device.

32 Claims, 9 Drawing Sheets

(56) References Cited

U.S. PATENT DOCUMENTS

2015/0339195 A1* 11/2015 Yang .................. G06F 11/1441
                                                              714/6.12
2015/0370701 A1* 12/2015 Higgins ............. G06F 12/0253
                                                              711/103
2016/0299722 A1* 10/2016 Seo ..................... G06F 3/0631

* cited by examiner

METHOD AND SYSTEM FOR MEMORY MANAGEMENT AND MEMORY STORAGE DEVICE THEREOF

CROSS-REFERENCE TO RELATED APPLICATION

This application claims the priority benefit of Taiwan application serial no. 104138377, filed on Nov. 20, 2015. The entirety of the above-mentioned patent application is hereby incorporated by reference herein and made a part of this specification.

BACKGROUND

Technical Field

The present invention relates to a memory management method, and more particularly, relates to a method and a system for memory management and a memory storage device thereof, which are capable of retaining the existing use information.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, an initialization operation is performed for a memory storage device which uses the rewritable non-volatile memory module as a storage medium after said memory storage device is manufactured. Normally, the initialization operation is used to write related data (e.g., MBR (master boot record), PT (Partition table), PBS (Partition boot sector), system information, etc.) into the rewritable non-volatile memory module. However, after the memory storage device is used for a period of time, abnormal condition may occur due to human factors or other causes. When abnormal condition occurs, the initialization operation may need to be re-performed for the rewritable non-volatile memory module of the memory storage device, so as to execute a formatting operation for the rewritable non-volatile memory module in order to restore the memory storage device to factory settings. Practically, after the memory storage device is used, use information (e.g., bad block information, an erasing count, a used time, etc.) corresponding to the rewritable non-volatile memory module will be recorded. After the formatting operation is executed, the existing use information cannot be retained since information stored in the rewritable non-volatile memory module will all be erased. Accordingly, problems are likely to occur in use because a practical usage of the rewritable non-volatile memory module cannot be known. For example, the bad blocks may be used more easily, or a service life of the rewritable non-volatile memory module cannot be accurately estimated according to the practical usage. Therefore, it has become one of the major subjects for person skilled in the art as how to retain the existing use information after the initialization operation is re-executed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a method and a system for memory management and a memory storage device thereof, which are capable of retaining the existing use information and establishing required data according to the existing use information when resetting the memory storage device.

One exemplary embodiment provides a memory management method for a memory storage device. The memory storage device has a rewritable non-volatile memory module, and the rewritable non-volatile memory module has a plurality of physical erasing units. The memory management method includes: receiving a command from a host system. The memory management method also includes: reading use information corresponding to the physical erasing units from the rewritable non-volatile memory module according to the command, writing the use information into a first physical erasing unit among the physical erasing units, and marking the first physical erasing unit with a recognizing flag. The memory management method further includes: erasing data in at least part of physical erasing units among the physical erasing units excepting the first physical erasing unit according to the recognizing flag, establishing a memory management table according to the use information stored in the first physical erasing unit, and operating the memory storage device according to the memory management table.

One exemplary embodiment provides a memory storage device, which includes a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module, and receives a command from the host system. Furthermore, the memory control circuit unit also reads use information corresponding to the physical erasing units from the rewritable non-volatile memory module according to the command, writes the use information into a first physical erasing unit among the physical erasing units, and marks the first physical erasing unit with a recognizing flag. Moreover, the memory control circuit unit further erases data in at least part of physical erasing units among the physical erasing units excepting the first physical erasing unit according to the recognizing flag. Further, the memory control circuit unit establishes a memory management table according to the use information stored in the first physical erasing unit, and operates the memory storage device according to the memory management table.

One exemplary embodiment of the invention provides a memory management system, which includes a host system and a memory storage device. The host system has a memory management unit. The memory storage device includes a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module. The memory management unit transmits a read command to the memory storage device, and the memory control circuit unit reads use information corresponding to the physical erasing units from the rewritable non-volatile memory module according to the read command in response to the read command. Furthermore, the memory management unit further transmits a write command to the memory storage device, and the memory control circuit unit further writes the use information into a first physical erasing unit among the physical erasing units and marks the first physical erasing unit with a recognizing flag according to the write command in response to the write command. Moreover, the memory management unit further transmits an erase command to the memory storage device, and the memory control circuit unit erases data in at least part of physical erasing units among the physical erasing units excepting the first physical erasing unit according to the erase command and the recognizing flag. Moreover, the memory management unit further transmits a create-table command to the memory storage device, and the memory control circuit unit further establishes a memory management table according to the create-table command and the use information stored in the first physical erasing unit, and operates the memory storage device according to the memory management table.

Based on the above, the method and the system for memory management and the memory storage device thereof as proposed by the exemplary embodiments of the invention are capable of retaining the existing use information and establishing required data according to the existing use information after the formatting operation is performed for the memory storage device. As a result, the effect of managing the rewritable non-volatile memory of the memory storage device by using the existing use information may be achieved accordingly.

To make the above features and advantages of the present disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
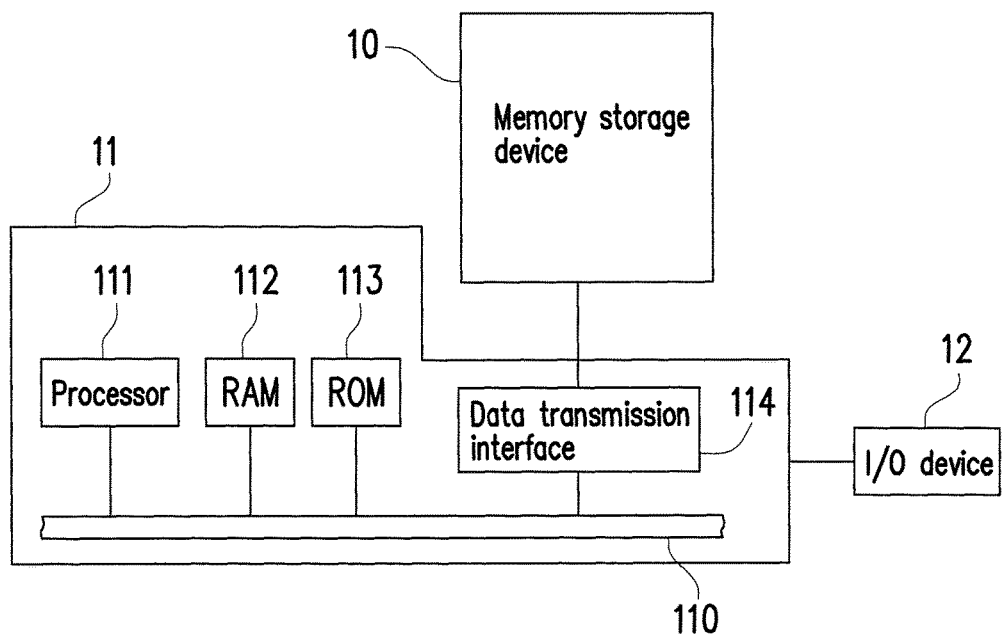
FIG. 1 is a schematic diagram illustrating a host system, a memory storage device and an input/output (I/O) device according to one exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the term is "a" (or "an"), "one or more" and "at least one" can be used interchangeably herein.

Generally, a memory storage device (also known as a memory storage system) includes a rewritable non-volatile memory module and a controller (also known as a control circuit unit). The memory storage device is usually configured together with a host system so that the host system may write data into the memory storage device or read data from the memory storage device.

Figure 2:
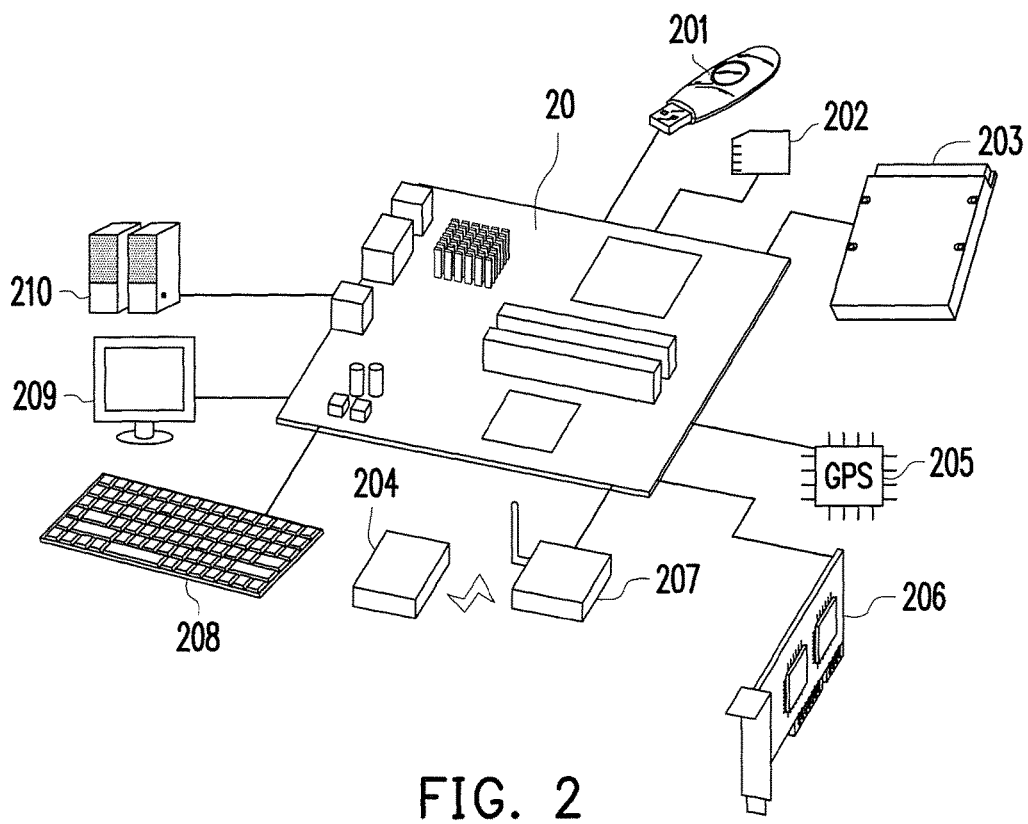
FIG. 2 is a schematic diagram illustrating a host system, a memory storage device and an input/output (I/O) device according to another exemplary embodiment.

FIG. 1 is a schematic diagram illustrating a host system, a memory storage device and an input/output (I/O) device according to one exemplary embodiment. FIG. 2 is a schematic diagram illustrating a host system, a memory storage device and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can write data into the memory storage device 10 or read data from the memory storage device 10 through the data transmission interface 114. Further, the host system 111 is coupled to an I/O device 12 through the system bus 110. For example, the host system 11 can transmit output signals to the I/O device 12 or receive input signals from I/O device 12 through the system bus 110.

In the present exemplary embodiment, the processor 111, the RAM 112, the ROM 113 and the data transmission interface 114 may be disposed on a main board 20 of the host system 11. An amount of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication Storage) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in one exemplary embodiment, the main board 20 can access the wireless memory storage device 204 through the wireless transmission device 207.

Figure 3:
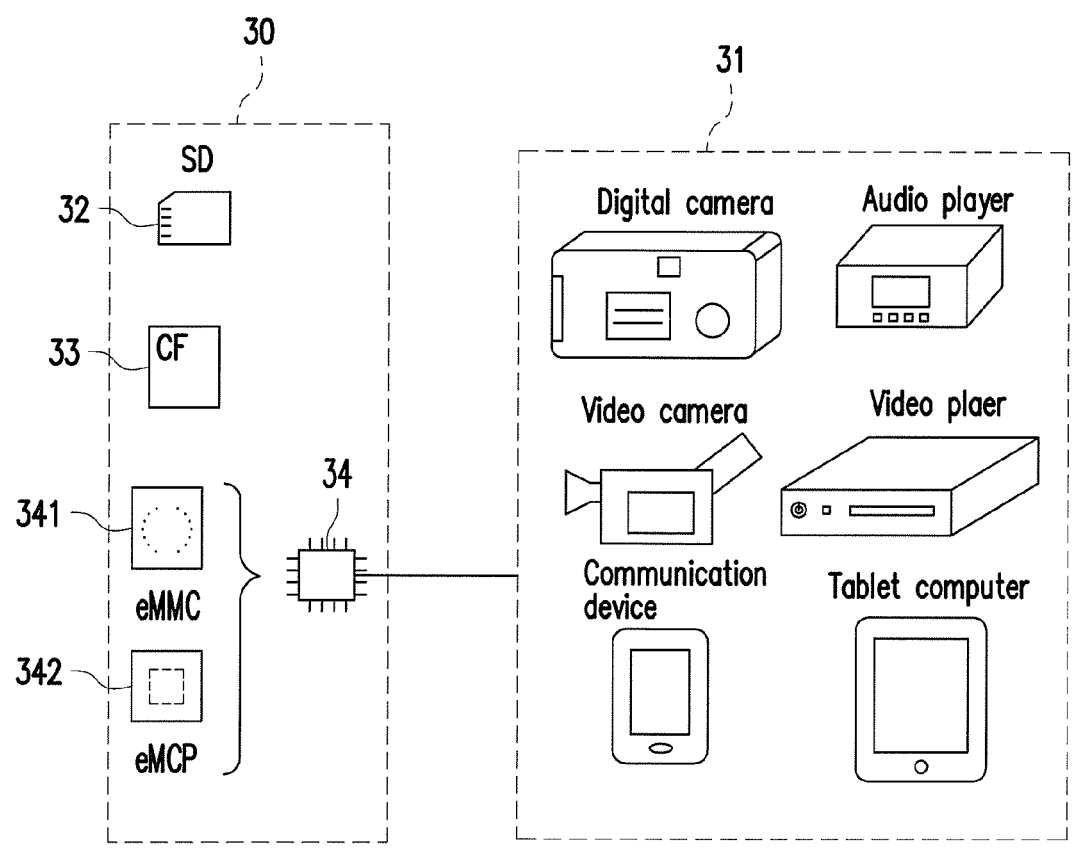
FIG. 3 is a schematic diagram illustrating a host system and a memory storage device according to one exemplary embodiment of the invention.

In one exemplary embodiment, aforementioned host system may be any systems capable of substantially cooperating with the memory storage device for storing data. Although the host system is illustrated as a computer system in foregoing exemplary embodiment, however, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
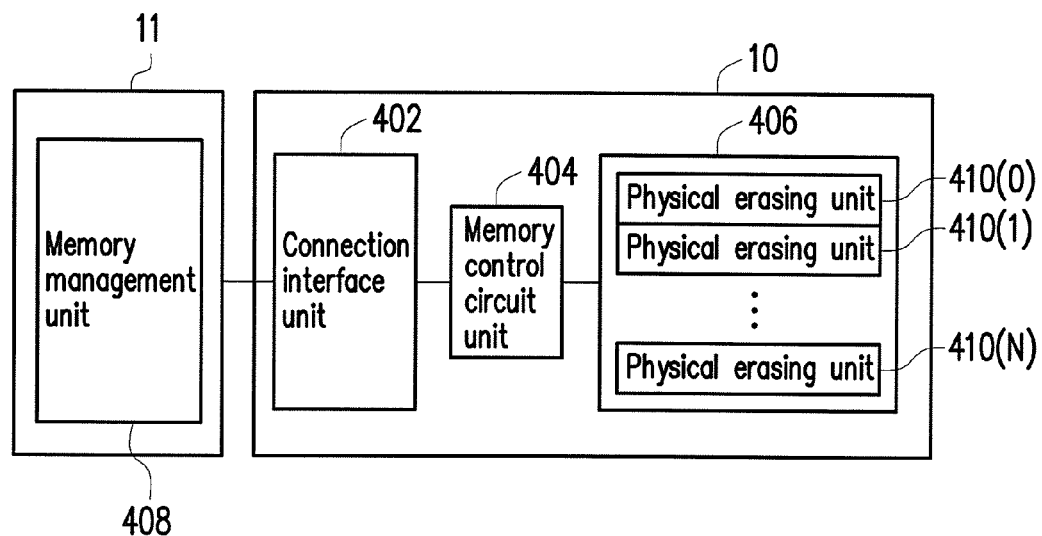
FIG. 4 is a schematic block diagram illustrating a host system and a memory storage device according to one exemplary embodiment.

FIG. 4 is a schematic block diagram illustrating a host system and a memory storage device according to one exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a SD (Secure Digital) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In the present exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control commands which are implemented in form of hardware or firmware, so as to execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 bytes. However, in other exemplary embodiments, the data bit area may also include more or less of the physical access addresses, and an amount and the size of the physical access addresses are not limited in the invention. For example, in one exemplary embodiment, the physical erasing unit is a physical block, and the physical programming unit is a physical page or a physical sector, but the invention is not limited thereto.

In the present exemplary embodiment, the rewritable non-volatile memory module 406 is a MLC (Multi Level Cell) NAND flash memory module (i.e., a flash memory module capable of storing two data bits in one memory cell). However, the present invention is not limited thereto. The rewritable non-volatile memory module 406 may also be a SLC (Single Level Cell) NAND flash memory module, (i.e., a flash memory module capable of storing one data bit in one memory cell), a TLC (Trinary Level Cell) NAND flash memory module (i.e., a flash memory module capable of storing three data bits in one memory cell), other flash memory modules or any memory module having the same features.

In the present exemplary embodiment, the host system 11 transmits a command related to an initialization operation to the memory storage device 10 through a memory management unit 408, and the memory control circuit unit 404 executes corresponding operations in response to the command received from the host system. For example, the memory management unit 408 includes an initialization application implemented by software program codes, which may be operated in an operation system (OS) of the host system 11. In the present exemplary embodiment, the operating system of the host system 11 is the Microsoft Windows operating system. Nevertheless, it should be understood that the invention is not limited thereto. The present invention may also be applied to Linux, Mac or other operating systems.

Figure 5:
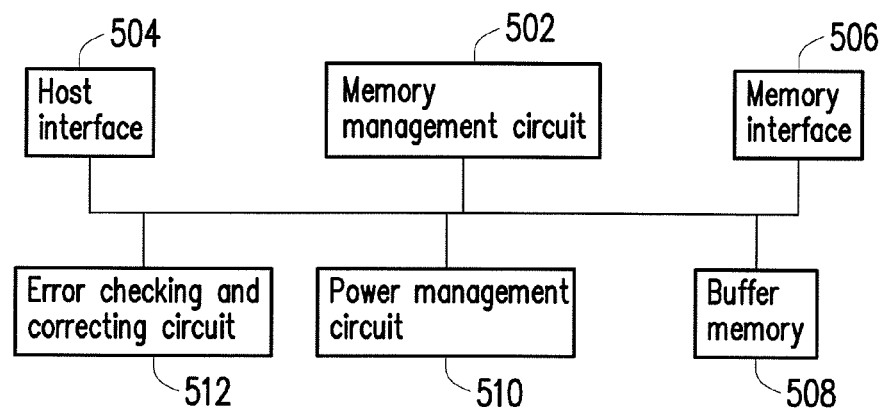
FIG. 5 is a schematic block diagram illustrating a memory control circuit unit according to one exemplary embodiment.

FIG. 5 is a schematic block diagram illustrating a memory control circuit unit according to one exemplary embodiment.

Referring to FIG. 5, the memory control circuit unit 404 includes a memory management circuit 502, a host interface 504, a memory interface 506, a buffer memory 508, a power management circuit 510, and an error checking and correcting circuit 512.

The memory management circuit 502 is configured to control overall operations of the memory control circuit unit 404. Specifically, the memory management circuit 502 has a plurality of control commands. During operations of the memory storage device 10, the control commands are executed to execute various operations such as writing, reading and erasing data.

In the present exemplary embodiment, the control commands of the memory management circuit 502 are implemented in form of firmware. For instance, the memory management circuit 502 has a microprocessor unit (not shown) and a read-only memory (not shown), and the control commands are burnt into the read-only memory. When the memory storage device 10 operates, the control commands are executed by the microprocessor to perform operations of writing, reading or erasing data.

Figure 6:
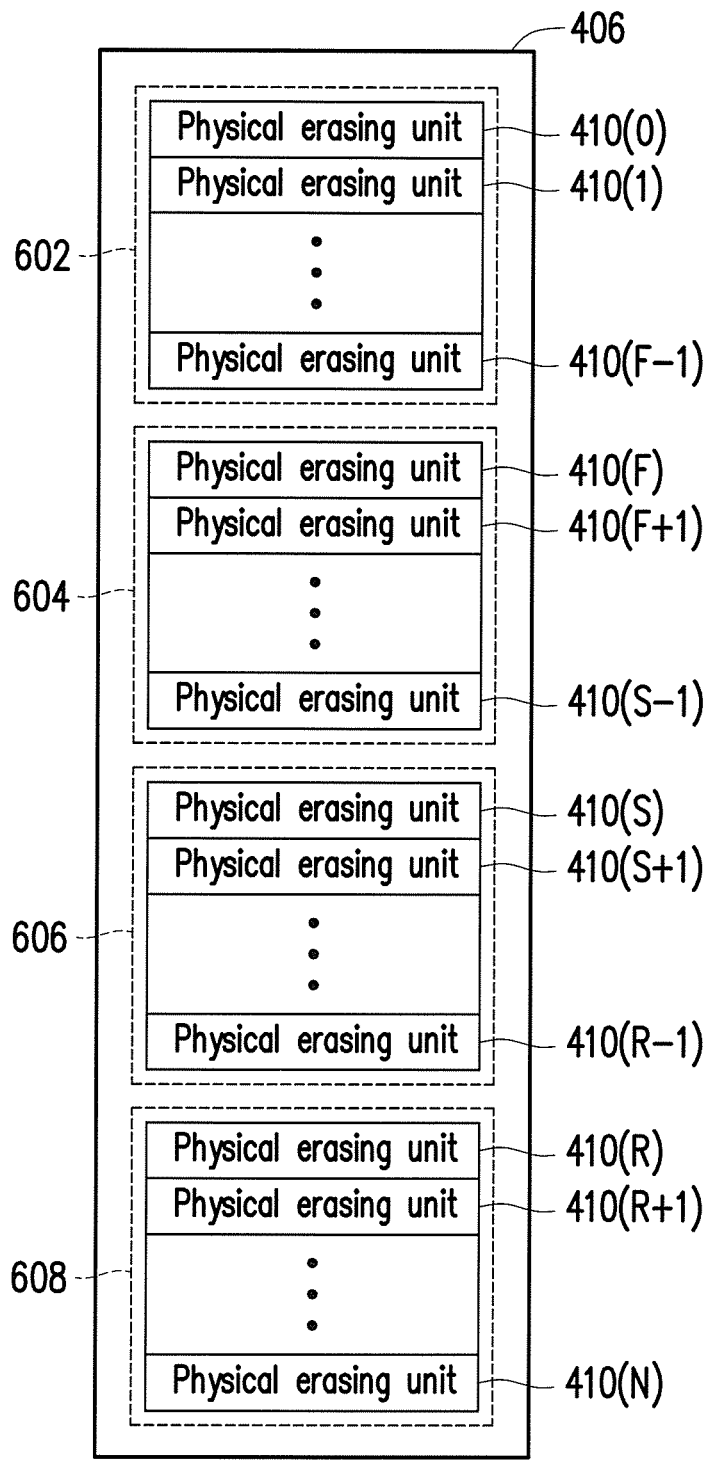
FIG. 6 and FIG. 7 are schematic diagrams illustrating a management of the physical erasing units according to one exemplary embodiment.
Figure 7:
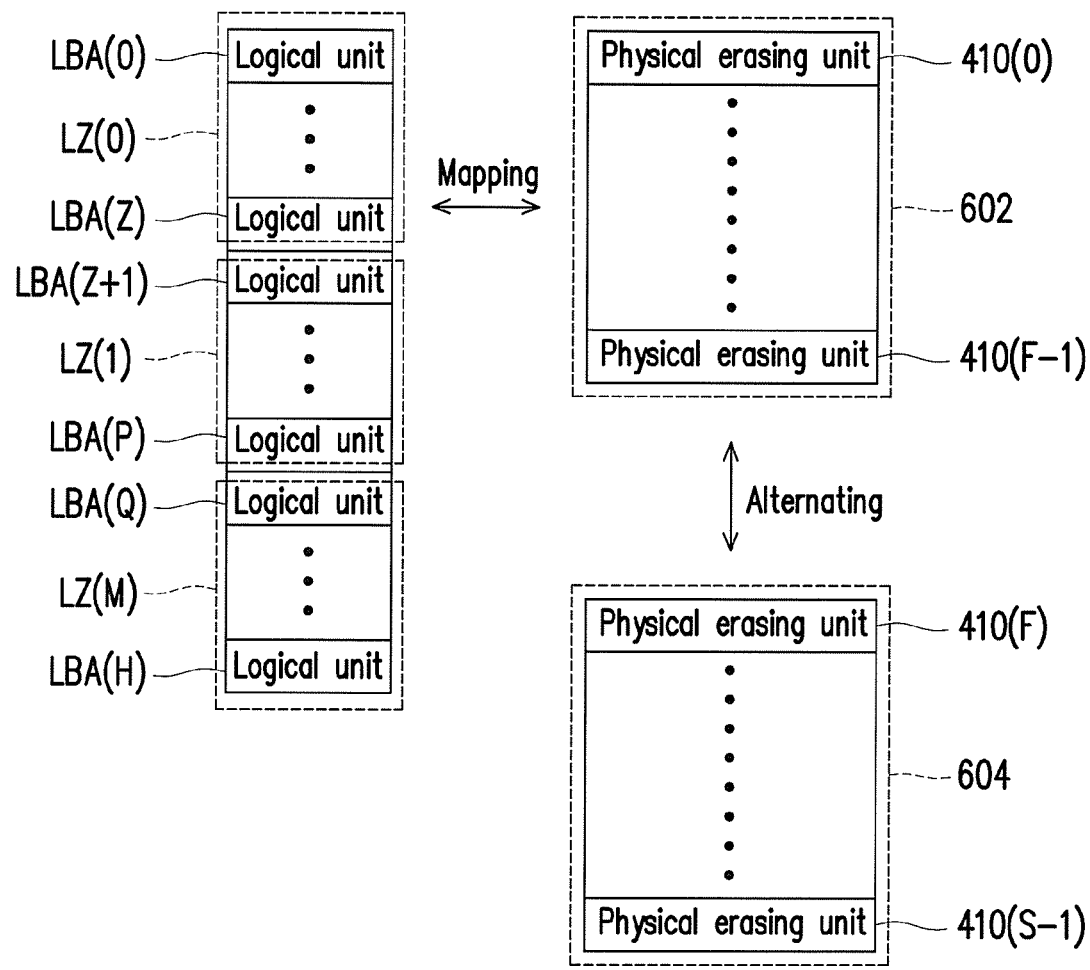

FIG. 6 and FIG. 7 are schematic diagrams illustrating a management of the physical erasing units according to one exemplary embodiment.

It should be understood that terms, such as "get", "group", "divide", "associate" and so forth, are logical concepts which describe operations in the physical erasing units of the rewritable non-volatile memory module 106. In other words, the physical erasing units of the rewritable non-volatile memory module are logically operated, but actual positions of the physical erasing units of the rewritable non-volatile memory module are not changed.

Referring to FIG. 6, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, when the write command and the data to be written are received from the host system 11, the memory management circuit 502 selects the physical erasing units from the spare area 604, and writes the data into the selected physical erasing units in order to replace the physical erasing units in the data area 602.

The physical erasing units logically belonging to the system area 606 are configured to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if normal physical erasing units are still available in the replacement area 608 when the physical erasing units of the data area 602 are damaged, the memory management circuit 502 can get the normal physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operations of the memory storage device 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 7, the memory control circuit unit 404 (or the memory management circuit 502) is configured with logical units LBA(0) to LBA(H) for mapping the physical erasing units of the data area 602, wherein each of the logical units includes a plurality of logical sub units for mapping to the corresponding physical programming units of the physical erasing units. Further, when the host system 11 intends to write the data into the logical units or update the data stored in the logical units, the memory control circuit unit 404 (or the memory management circuit 502) can get one physical erasing units from the spare area 604 for writing the data as an alternately exchange of the physical erasing units of the data area 602. In this exemplary embodiment, the logical sub-units may be logical pages or logical sectors.

In order to identify which of the physical erasing units is stored with the data of each logical unit, the memory control circuit unit 404 (or the memory management circuit 502) may record the mapping relations between the logical units and the physical erasing units in the present exemplary embodiment. Further, when the host system 11 intends to access the data in the logical sub-unit, the memory control circuit unit 404 (or the memory management circuit 502) confirms the logical unit to which the logical sub-unit belongs, and accesses the data in the physical erasing unit mapped to said logical unit. For instance, in the present exemplary embodiment, the memory control circuit unit 404 (or the memory management circuit 502) may store a logical address-physical address mapping table into the rewritable non-volatile memory module 406 for recording the physical erasing units mapped to each of the logical units, and the logical address-physical address mapping table is loaded into the buffer memory 508 for maintenance when the memory control circuit unit 404 (or the memory management circuit 502) intends to the access the data.

It should be noted that, the mapping table cannot record the mapping relation for all of the logical units because a capacity of the buffer memory 508 is limited. Therefore, in the present exemplary embodiment, the memory control circuit unit 404 (or the memory management circuit 502) groups the logical units LBA(0) to LBA(H) into a plurality of logical zones LZ(0) to LZ(M), and configures one logical address-physical address mapping table for each of the logical zones. In particular, when the memory control circuit unit 404 (or the memory management circuit 502) intends to update the mapping table for one specific logical unit, the logical address-physical address mapping table of the logical zone to which the logical unit belongs is correspondingly loaded into the buffer memory 508 for updating.

In another exemplary embodiment, the control commands of the memory management circuit 502 may also be stored into a specific area (for example, a system area in the memory module exclusively used for storing the system data) of the rewritable non-volatile memory module 406 as program codes. In addition, the memory management circuit 502 has a microprocessor unit (not illustrated), a ROM (not illustrated) and a RAM (not illustrated). Particularly, the ROM has an activate code, which is executed by the microprocessor unit to load the control commands stored in the rewritable non-volatile memory module 406 to the RAM of the memory management circuit 502 when the memory control circuit unit 404 is enabled. Thereafter, the control commands are executed by the microprocessor unit to execute operations of writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to issue a write command to the rewritable non-volatile memory module 406 in order to write data into the rewritable non-volatile memory module 406; the memory reading circuit is configured to issue a read command to the rewritable non-volatile memory module 406 in order to read data from the rewritable non-volatile memory module 406; the memory erasing circuit is configured to issue an erase command to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406.

Referring back to FIG. 5, the host interface 504 is coupled to the memory management circuit 502 and configured to couple to the connection interface unit 402, so as to receive and identify commands and data sent from the host system 11. In other words, the commands and data sent from the host system 11 are passed to the memory management circuit 502 through the host interface 504. In the present exemplary embodiment, the host interface 504 is compatible with the SATA standard. However, it should be understood that the present invention is not limited thereto, and the host interface 504 may also be compatible with the PATA standard, the IEEE 1394 standard, the PCI Express standard, the USB standard, the UHS-I standard, the UHS-II standard, the SD standard, the MS standard, the MMC standard, the CF standard, the IDE standard, or other suitable standards for data transmission.

The memory interface 506 is coupled to the memory management circuit 502 and configured to access the rewritable non-volatile memory module 406. That is to say, data to be written into the rewritable non-volatile memory module 406 will be converted into a format acceptable to the rewritable non-volatile memory module 406 through the memory interface 506.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting process to ensure the correctness of data. Specifically, when the memory management circuit 502 receives a write command from the host system 11, the error checking and correcting circuit 512 generates an ECC code (Error Checking and Correcting Code) for data corresponding to the write command, and the memory management circuit 502 writes data and the ECC code corresponding to the write command into the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

When the memory management circuit 502 executes the initialization operation according to an initialization command of the host system 11, the memory management circuit 502 initializes the physical erasing units 410(0) to 410(N), identifies good physical erasing units among the physical erasing units 410(0) to 410(N) of the rewritable non-volatile memory module 406, groups the good physical erasing units into the data area 602, the spare area 604 and the system area 606, and then groups the remaining good physical erasing units into the replacement area 608. For instance, while the memory storage device 10 is initialized (i.e., programmed for the first time) after being manufactured, the memory management circuit 502 erases all data from each page address within the physical erasing units 410(0) to 410(N) to be 0xFF data, and performs a disk scanning (e.g., a reading/writing test) to identify normal physical erasing units from damaged physical erasing units. In addition, the memory management circuit 502 also establishes a logical address-physical address mapping table to record a mapping relation between the logical units and the physical erasing units. After the initialization operation is completed, the memory management circuit 502 transmits a confirmation message to the host system 11 in response to the initialization command. For example, the memory management circuit 502 responds to the host system after establishing the logical address-physical address mapping table.

After the initialization operation is completed, while using the memory storage device 10, the memory management circuit 502 also records use information corresponding to the physical erasing units 410(0) to 410(N) of the rewritable non-volatile memory module 406 into the rewritable non-volatile memory module 406.

In the present exemplary embodiment, when the initialization operation is to be performed for the memory storage device 10 again, the memory control circuit unit 404 (or the memory management circuit 502) first records current use information corresponding to the physical erasing units 410(0) to 410(N) of the rewritable non-volatile memory module 406. The use information may include various information used when managing the rewritable non-volatile memory module 406 by the memory control circuit unit 404 (or the memory management circuit 502), such as bad block information, erasing count information, used time information or reading count information.

More specifically, the memory control circuit unit 404 (or the memory management circuit 502) can establish a bad block management table according to the bad block information for recording bad physical erasing units in the rewritable non-volatile memory module, such that the memory control circuit unit 404 (or the memory management circuit 502) can avoid accessing the damaged physical erasing units. For example, while establishing the logical address-physical address mapping table, the logical units may be prevented from being mapped to the damaged physical erasing units according to the bad block management table.

The erasing count information records an erasing count of the physical erasing unit of the rewritable non-volatile memory module 406. Specifically, the memory control circuit unit 404 (or the memory management circuit 502) can calculate a service life of the rewritable non-volatile memory module 406 according to the erasing count information, so as to evaluate a wear level of the rewritable non-volatile memory module 406 and timely remind or warn the user according to the calculated service life. For example, a warning message is sent when the service life matches a preset value. Furthermore, the memory control circuit unit 404 (or the memory management circuit 502) can also execute a wear leveling operation of the rewritable non-volatile memory module 406 according to the erasing count information, so as to evenly use each of the physical erasing units in the rewritable non-volatile memory module. As a result, overuse of some "particular" physical erasing units may be prevented from the over-large erasing count which leads to increases in both error rate and aging speed for the data stored thereon. Moreover, some "particular" physical may also be protected from being marked as the bad physical erasing units which cannot be further used when the erasing count reaches a limit value guaranteed by the manufacturer. Further, in process of programming, aging of the memory cells of the rewritable non-volatile memory module will occur with frequent injection and removal of the electrons, resulting in increasing writing speed of the electrons and wider threshold voltage distribution. Therefore, after being programed for multiple times, the memory cells may fail to correctly identify their own storage states and generate error bits accordingly. The memory control circuit unit 404 (or the memory management circuit 502) can also adjust a read voltage of the memory cells of the rewritable non-volatile memory module according to the erasing count information, so as to reduce occurrence of the error bits.

The used time information may record a total used time of the memory storage device 10. For example, the used time information may record an elapsed time of the memory storage device 10 started from power-on to power-off each time, and a sum of the elapsed times is the total used time. In addition, the used time information may also record an elapsed time started since the memory storage device 10 is powered-on for the first time as the total used time. If the data stored in each physical erasing unit in the rewritable non-volatile memory module 406 is not moved nor updated for a long period of time, the originally stored data may change due to a charge leakage phenomenon. The memory control circuit unit 404 (or the memory management circuit 502) can come to understand a used state of each physical erasing unit in the rewritable non-volatile memory module 406 during the long period of time according to the used time information and timely remind or warn the user to move or update the data according to the used state in order to prevent data loss.

Further, when the data stored by the same specific physical programming unit is read for multiple times (e.g., the reading count is between one hundred thousand and one million times), influences may be made to the data stored in the physical programming units near said specific physical programming unit to change the data stored in said nearby physical programming units. This kind of phenomenon is well known as "read-disturb" by person skilled in the art. In the present exemplary embodiment, the memory control circuit unit 404 (or the memory management circuit 502) can also execute a data updating operation of the rewritable non-volatile memory module 406 according to the reading count information, so as to prevent aforesaid read-disturb phenomenon.

The memory control circuit unit 404 (or the memory management circuit 502) can determine a read count each of the physical programming units according to the reading count information. Further, when the read count of one specific physical programming unit being read reaches a specific count, the memory control circuit unit 404 (or the memory management circuit 502) can execute the data updating operation for the physical erasing unit to which the specific physical programming unit belongs, so as perform data moving and erasing for such physical erasing unit.

Specifically, the use information may be stored into at least one of the physical erasing units (e.g., the physical erasing unit in the system area) of the rewritable non-volatile memory module 406. The memory control circuit unit 404 (or the memory management circuit 502) can read the use information from the rewritable non-volatile memory module 406 and writes the read use information into at least one of the physical erasing units not written with data (hereinafter, also referred to as a first physical erasing unit) in the rewritable non-volatile memory module 406. After storing the use information into the first physical erasing unit, the memory control circuit unit 404 (or the memory management circuit 502) initializes at least part of the physical erasing units excepting the first physical erasing unit. For example, the memory control circuit unit 404 (or the memory management circuit 502) can erase the data at the address of each physical programming unit in the physical erasing units 410(0) to 410(N) excepting the first physical erasing unit to be 0xFF data, and write a firmware code into the rewritable non-volatile memory module 406. Further, the memory control circuit unit 404 (or the memory management circuit 502) also establishes a memory management table required for the firmware code according to the use information stored in the first physical erasing unit, and operates the memory storage device 10 according to the established memory management table.

The memory management table may include the logical address-physical address mapping table for accessing the physical erasing units of the rewritable non-volatile memory module 406. For example, according to the bad block information, the memory control circuit unit 404 (or the memory management circuit 502) can associate non-damaged physical erasing units to a use area or the spare area or manage the physical erasing units by other management methods, which are not particularly limited by the invention. Furthermore, the memory management table may also include an erasing count management table established according to the erasing count information, a used time management table established according to the used time information, and a reading count management table established according to the reading count information. The erasing count management table and the used time management table may be used to execute the service life calculation, the wear leveling operation or the data updating operation of the rewritable non-volatile memory module 406. The reading count management table may be used to execute the data updating operation of the rewritable non-volatile memory module 406.

Figure 8A:
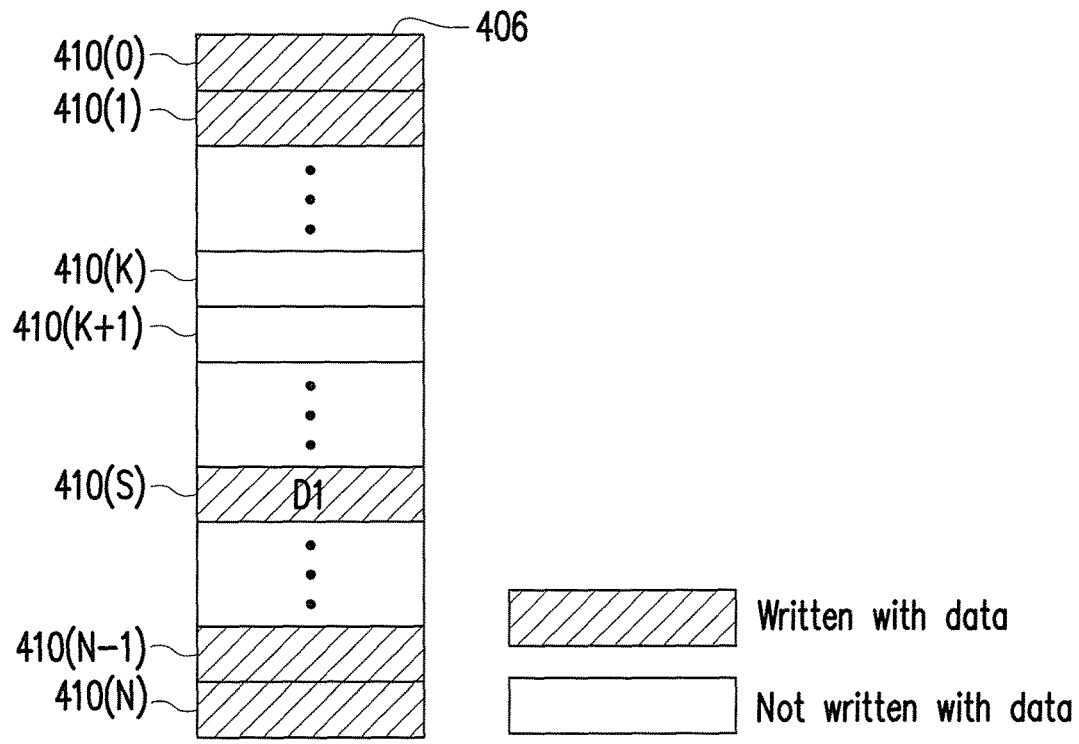
FIG. 8A to FIG. 8B illustrate schematic diagrams for recording the current use information according to one exemplary embodiment.
Figure 8B:
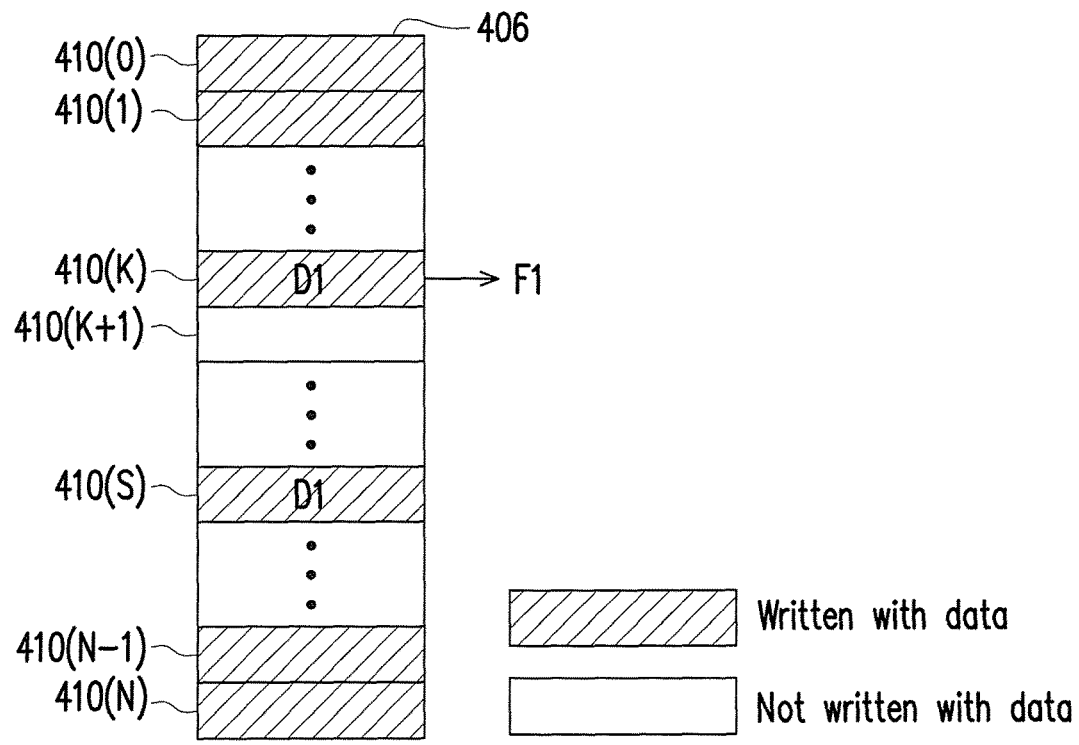

FIG. 8A and FIG. 8B illustrate schematic diagrams for writing the user information into the rewritable non-volatile memory module in the memory management method according to one exemplary embodiment.

Referring to FIG. 8A and FIG. 8B, use information D1 corresponding to the physical erasing units 410(0) to 410(N) of the rewritable non-volatile memory module 406 is stored in the physical erasing unit 410(S). Accordingly, the memory control circuit unit 404 (or the memory management circuit 502) first reads the use information D1 stored in the physical erasing unit 410(S). Also, the memory control circuit unit 404 (or the memory management circuit 502) records the current use information D1 by retrieving one physical erasing unit 410(K) not written with data, writing the use information D1 into the physical erasing unit 410(K), and marking the physical erasing unit 410(K) with a recognizing flag F1.

Figure 9:
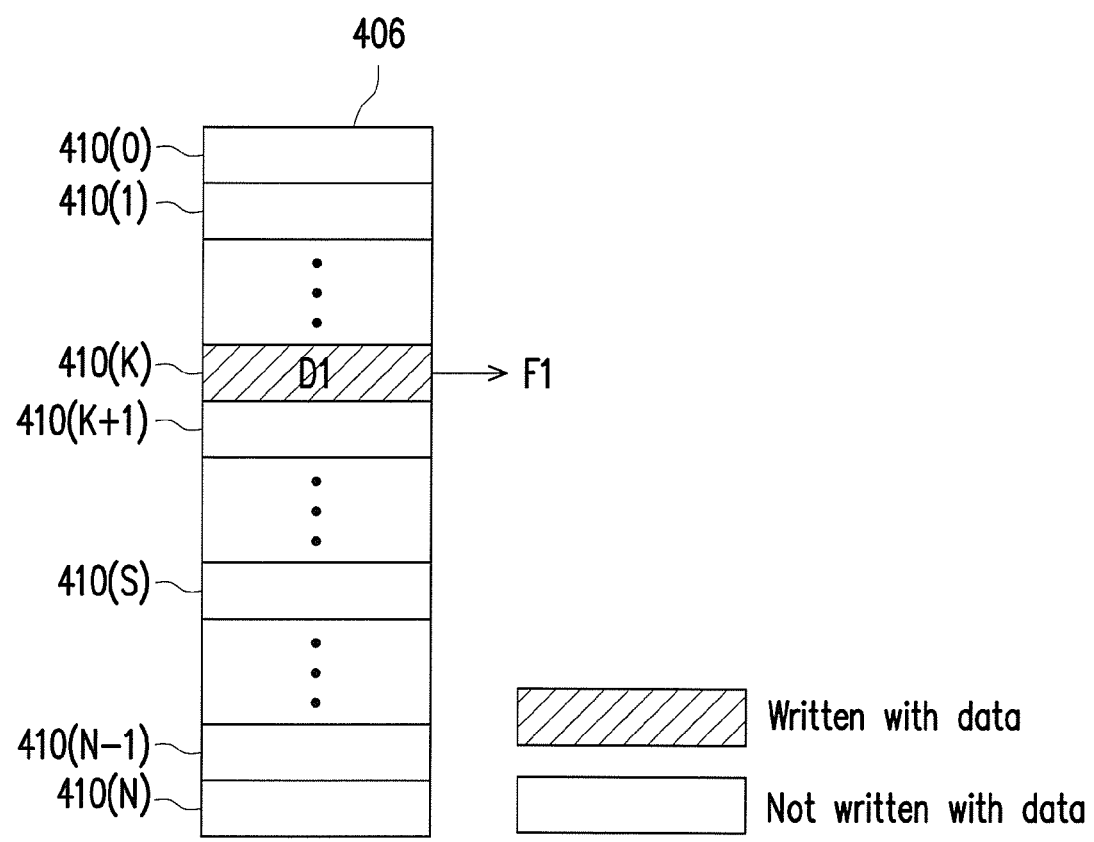
FIG. 9 illustrates a schematic diagram for erasing data in the physical erasing unit according to one exemplary embodiment.

FIG. 9 illustrates a schematic diagram for erasing data in the physical erasing unit in the memory management method according to one exemplary embodiment.

Referring to FIG. 9, when an erasing operation is to be performed for the physical erasing units in the rewritable non-volatile memory module 406, the memory control circuit unit 404 (or the memory management circuit 502) determines whether each of the physical erasing units is marked with recognizing flag F1 in order to decide whether to execute the erasing operation for the respective ones or not. As shown by FIG. 9, the memory control circuit unit 404 (or the memory management circuit 502) determines that the physical erasing unit 410(K) is marked with the recognizing flag F1 and thus determines not to erase the data (i.e., the use information D1) stored in the physical erasing unit 410(K). Moreover, the memory control circuit unit 404 (or the memory management circuit 502) further determines that the other physical erasing units in the rewritable non-volatile memory module 406 are not marked with the recognizing flag F1 and thus determines to erase the data stored in those physical erasing units.

In the present exemplary embodiment, when receiving a command from the host system, the memory storage device 10 uses the firmware code of its own to performs the memory management method proposed by the present invention. In another exemplary embodiment, the memory management unit 408 of the host system 11 may be used to instruct the memory control circuit unit 404 (or the memory management circuit 502) to execute the corresponding operations. For example, when the memory storage device 10 needs to re-execute the initialization operation and the memory storage device 10 is coupled to the host system 11, the memory management unit 408 of the host system 11 can transmit a command to the memory storage device 10 so that the memory control circuit unit 404 (or the memory management circuit 502) executes the corresponding operations according to the command of the memory management unit 408 in response to the command from the host system 11. Herein, in another exemplary embodiment, the memory management unit 408 can transmit a read command, which instructs to read the use information, to the memory storage device 10 so that the memory control circuit unit 404 (or the memory management circuit 502) of the memory storage device 10 reads the use information from rewritable non-volatile memory module 406 according to the received read command in response to the read command from the host system 11. More specifically, the memory management unit 408 can issue other commands according to response messages of the memory control circuit unit 404 (or the memory management circuit 502). For example, when the host system 11 receives a read-completed response message transmitted by the memory control circuit unit 404 (or the memory management circuit 502), the memory management unit 408 can transmit a write command, which instructs to write the use information into the rewritable non-volatile memory module 406, to the memory storage device 10. Accordingly, the memory control circuit unit 404 (or the memory management circuit 502) of the memory storage device 10 writes the use information into one physical erasing unit not written with data in the rewritable non-volatile memory module 406 according to the received write command, and marks said physical erasing unit for writing the use information with the recognizing flag in response to the write command from the host system 11. Furthermore, when the host system 11 receives a write-completed response message transmitted by the memory control circuit unit 404 (or the memory management circuit 502), the memory management unit 408 can transmit an erase command, which instructs to erase data in the physical erasing units not marked with the recognizing flag, to the memory storage device 10. Accordingly, the memory control circuit unit 404 (or the memory management circuit 502) of the memory storage device 10 performs the erasing operation for the physical erasing units not marked with the recognizing flag in the rewritable non-volatile memory module 406 according to the erase command. In addition, according to an update firmware code command transmitted by the memory management unit 408, the memory control circuit unit 404 (or the memory management circuit 502) writes an update firmware code from the host system 11 into the rewritable non-volatile memory module 406, and establishes the memory management table according to the stored use information. Moreover, after all the related operations are completed, the memory control circuit unit 404 (or the memory management circuit 502) can transmit the confirmation message in response to the update firmware code command from the host system 11.

Figure 10:
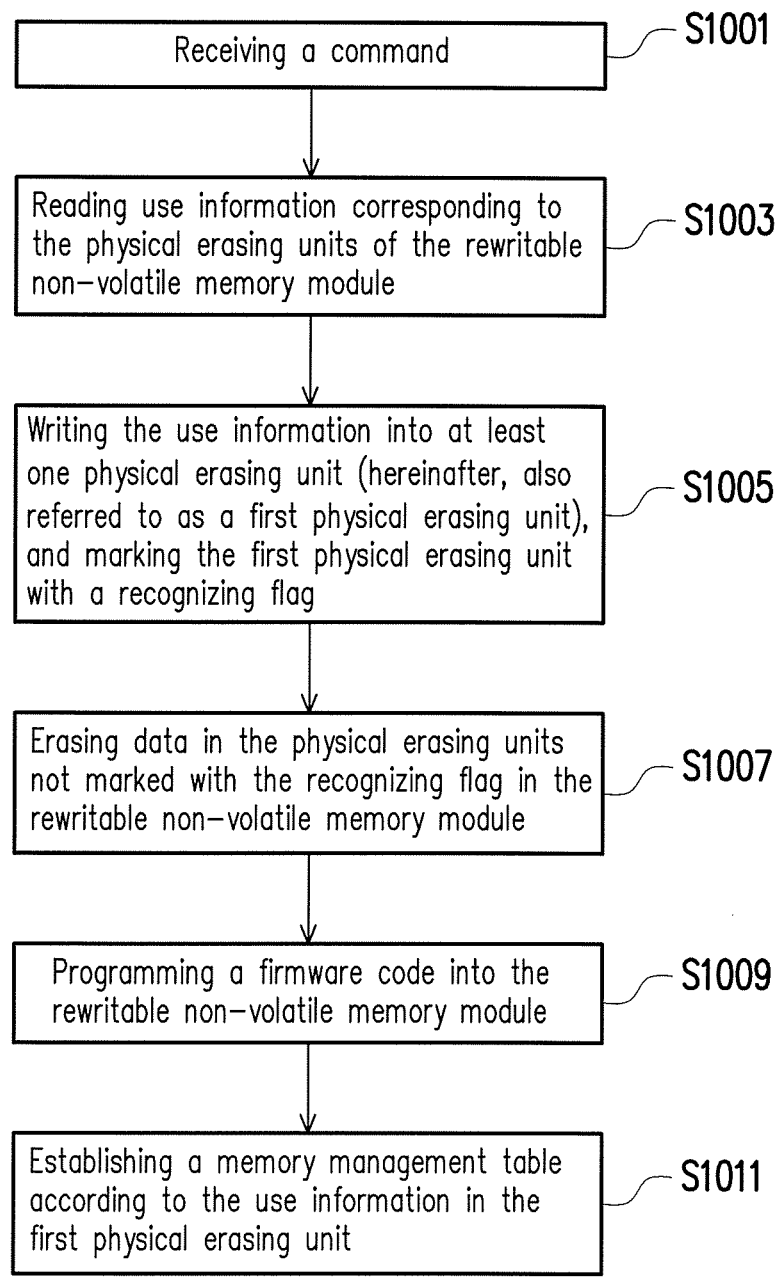
FIG. 10 is a flowchart illustrating a memory management method according to one exemplary embodiment.

FIG. 10 is a flowchart illustrating a memory management method according to one exemplary embodiment.

Referring to FIG. 10, in step S1001, the memory control circuit unit 404 (or the memory management circuit 502) receives a command from the host system 11.

In step S1003, the memory control circuit unit 404 (or the memory management circuit 502) reads use infatuation corresponding to the physical erasing units of the rewritable non-volatile memory module. The use information may include various information used when managing the rewritable non-volatile memory module 406 by the memory control circuit unit 404 (or the memory management circuit 502), such as bad block information, erasing count information, used time information or reading count information. Details regarding the use information have been described in the foregoing embodiment, which are not repeated hereinafter.

In step S1005, the memory control circuit unit 404 (or the memory management circuit 502) writes the use information into at least one physical erasing unit (hereinafter, also referred to as a first physical erasing unit) of the rewritable non-volatile memory module, and marks the first physical erasing unit with a recognizing flag. Specifically, the memory control circuit unit 404 (or the memory management circuit 502) searches for the physical erasing unit not programmed with data in the rewritable non-volatile memory module for writing the read use information. In the present exemplary embodiment, the physical erasing unit for writing the use information may be the physical erasing unit not programmed with data in the spare area. However, in other exemplary embodiments, the physical erasing unit for writing the use information may also be the physical erasing unit not programmed with data in the replacement area or the system area, which are not particularly limited by the present invention. Further, the memory control circuit unit 404 (or the memory management circuit 502) then marks the first physical erasing unit with the recognizing flag. For example, the recognizing flag marked as 1 indicates that the first physical erasing unit is the physical erasing unit for writing the use information, or the physical erasing unit protected from being erased or written. Nonetheless, the recognizing flag marked may also be marked as 0 or more bits, which are not particularly limited by the invention.

In step S1007, the memory control circuit unit 404 (or the memory management circuit 502) erases data in the physical erasing units not marked with the recognizing flag, such as the physical erasing units excepting the first physical erasing unit in the rewritable non-volatile memory module. For instance, excluding the first physical erasing unit for writing the use information, the memory control circuit unit 404 (or the memory management circuit 502) executes the erasing operation on at least part of or all the other physical erasing units in the rewritable non-volatile memory module, so as to erase the data stored in these physical erasing units. In other words, the first physical erasing unit for writing the use information is protected during the erasing operation, and the data stored in the first physical erasing unit can only be erased if a special command is issued. More specifically, the memory control circuit unit 404 (or the memory management circuit 502) can determine the physical erasing unit for which the erasing operation is executed. For example, if the recognizing flag marked as 1 is used to indicate the physical erasing unit for writing the use information, the memory control circuit unit 404 (or the memory management circuit 502) does not execute the erasing operation for the physical erasing unit marked with the recognizing flag as 1 according to ordinary operating commands.

In step S1009, the memory control circuit unit 404 (or the memory management circuit 502) programs a firmware code from the host system into the rewritable non-volatile memory module. The firmware code may be the update firmware code provided by the manufacturer.

In step S1011, the memory control circuit unit 404 (or the memory management circuit 502) establishes a memory management table according to the use information written in the first physical erasing unit. Specifically, the memory control circuit unit 404 (or the memory management circuit 502) establishes the memory management table by reading the use information from the first physical erasing unit, and operates the memory storage device according to the memory management table. In other words, the memory control circuit unit 404 (or the memory management circuit 502) uses the use information stored in the first physical erasing unit as the current use information to establish the memory management table in order to manage the rewritable non-volatile memory module (e.g., by loading the memory management table into the buffer memory for data access and maintenance).

In addition, after the erasing operation is executed, the memory control circuit unit 404 (or the memory management circuit 502) also stores other data related to the operations of the memory storage device (e.g., system information, etc.) into the rewritable non-volatile memory module.

Figure 11:
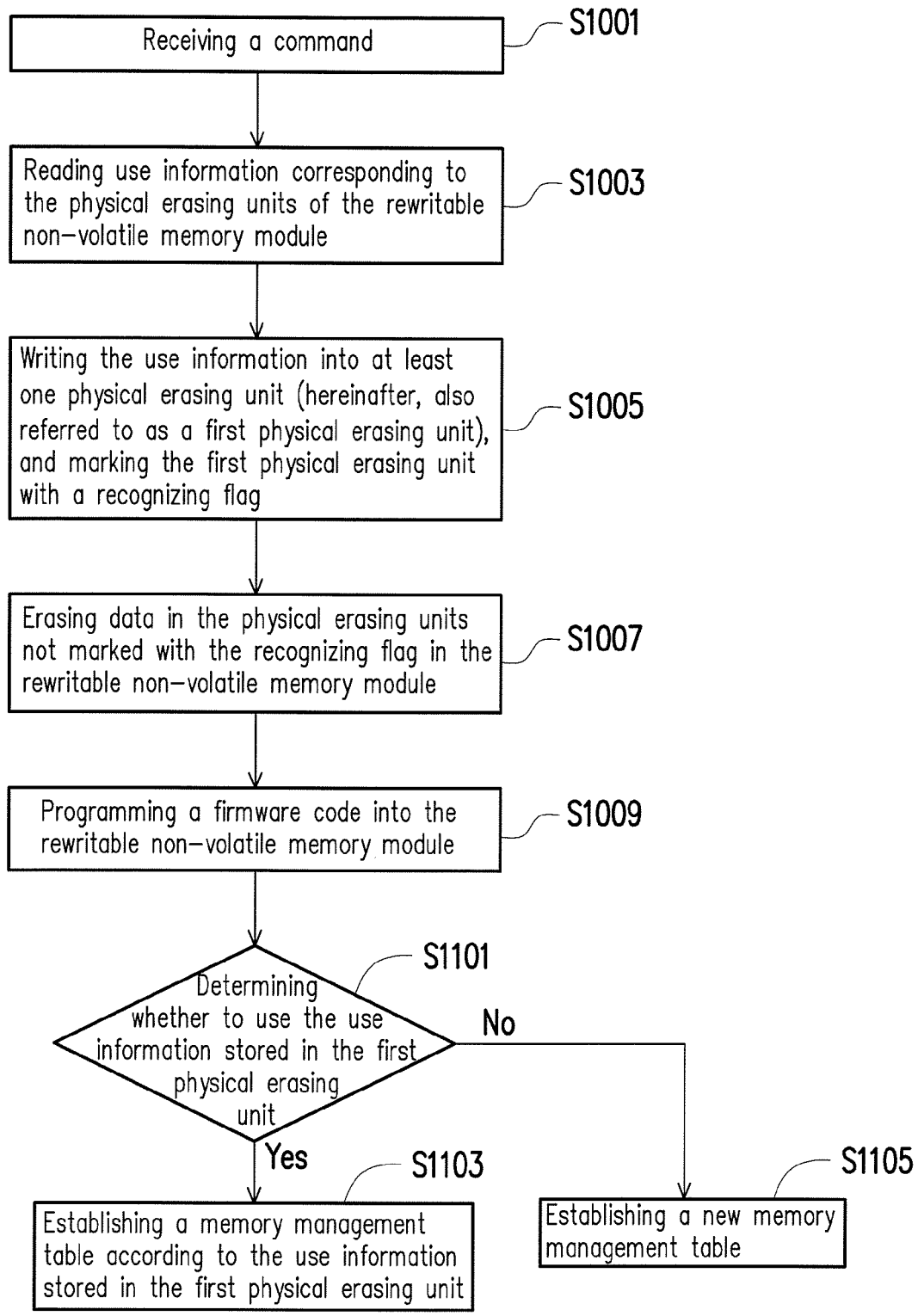
FIG. 11 is a flowchart illustrating a memory management method according to another exemplary embodiment.

FIG. 11 is a flowchart illustrating a memory management method according to another exemplary embodiment. Steps S1001 to S1009 in FIG. 11 are identical to the steps with the same reference number as provided in FIG. 10, and thus the related descriptions thereof are not repeated for FIG. 11. Hereinafter, only the difference between FIG. 10 and FIG. 11 is described.

Referring to FIG. 11, after the firmware code is programmed into the rewritable non-volatile memory module by the memory control circuit unit 404 (or the memory management circuit 502), in step S1101, the memory control circuit unit 404 (or the memory management circuit 502) determines whether to use the use information stored in the first physical erasing unit. The memory control circuit unit 404 (or the memory management circuit 502) can determine whether to use the use information stored in the first physical erasing unit according to the command from the host system. For example, the command issued by the host system may instruct to use the use information stored in the first physical erasing unit.

If determining to use the use information stored in the first physical erasing unit, in step S1103, the memory control circuit unit 404 (or the memory management circuit 502) establishes a memory management table according to the use information stored in the first physical erasing unit. In other words, the memory control circuit unit 404 (or the memory management circuit 502) uses the use information stored in the first physical erasing unit as the current use information.

If determining not to use the use information stored in the first physical erasing unit, in step S1105, the memory control circuit unit 404 (or the memory management circuit 502) establishes a new memory management table.

In summary, the method and the system for memory management and the memory storage device thereof according to the present invention are capable of retaining the existing use information when the formatting operation is performed on the rewritable non-volatile memory module, and managing the rewritable non-volatile memory module of the memory storage device by using the existing use information, so as to solve the management problems caused by loss of the existing use information.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a memory storage device, wherein the memory storage device has a rewritable non-volatile memory module having a plurality of physical erasing units, and the memory management method comprising:

reading use information corresponding to the physical erasing units from the rewritable non-volatile memory module according to a received read command which is transmitted from the host system;
writing the read use information into a first physical erasing unit among the physical erasing units, and marking the first physical erasing unit with a recognizing flag according to a received write command which is transmitted from the host system in response to completion of the reading of the use information;
erasing data in at least part of physical erasing units among the physical erasing units excepting the first physical erasing unit having the recognizing flag according to a received erase command which is transmitted from the host system in response to completion of the writing of the use information; and
establishing a memory management table according to the use information stored in the first physical erasing unit, and operating the memory storage device according to the memory management table.

2. The memory management method of claim 1, wherein the step of establishing the memory management table according to the use information stored in the first physical erasing unit is executed after the step of erasing the data in the at least part of physical erasing units among the physical erasing units excepting the first physical erasing unit.

3. The memory management method of claim 2, further comprising:
searching for a physical erasing unit not programmed with data among the physical erasing units to serve as the first physical erasing unit; and
if the physical erasing unit not programmed with data does not exist among the physical erasing units, announcing that the memory storage device is in a write protect state.

4. The memory management method of claim 2, further comprising:
writing a firmware code from the host system into the rewritable non-volatile memory module.

5. The memory management method of claim 1, wherein the command is an initialization command instructing to execute an initialization operation for the memory storage device, wherein the step of establishing the memory management table according to the use information stored in the first physical erasing unit comprises:
establishing a logical address-physical address mapping table according to the use information stored in the first physical erasing unit in response to the initialization command.

6. The memory management method of claim 1, wherein the step of establishing the memory management table according to the use information stored in the first physical erasing unit comprises:
if determining to use the use information stored in the first physical erasing unit, establishing the memory management table according to the use information stored in the first physical erasing unit; and
if determining not to use the use information stored in the first physical erasing unit, establishing a new memory management table.

7. The memory management method of claim 1, wherein the use information comprises bad block information, wherein the memory management method comprises:
establishing a bad block management table according to the bad block information to avoid accessing a damaged physical erasing unit.

8. The memory management method of claim 1, wherein the use information comprises erasing count information, wherein the memory management method further comprises:
calculating a service life of the rewritable non-volatile memory module according to the erasing count information and determining whether to send a warning message according to the service life, or executing a wear leveling operation of the rewritable non-volatile memory module according to the erasing count information.

9. The memory management method of claim 1, wherein the use information comprises used time information, wherein the memory management method comprises:
calculating a service life of the rewritable non-volatile memory module according to the used time information, or executing a data updating operation of the rewritable non-volatile memory module according to the used time information.

10. The memory management method of claim 1, wherein the use information comprises reading count information, wherein the memory management method comprises:
determining a read count of at least one physical programming unit according to the reading count information, and executing a data updating operation for a physical erasing unit to which the at least one physical programming unit belongs if the read count of the at least one physical programming unit reaches a read count threshold.

11. The memory management method of claim 1, wherein the memory management table comprises a logical address-physical address mapping table, an erasing count management table, a used time management table and a reading count management table, wherein the step of operating the memory storage device according to the memory management table comprises:
accessing the physical erasing units according to the logical address-physical address mapping table, calculating a service life of the rewritable non-volatile memory module and executing a wear leveling operation of the rewritable non-volatile memory module according to the erasing count management table and the used time management table, and executing a data updating operation of the rewritable non-volatile memory module according to the used time management table and the reading count management table.

12. A memory storage device, comprising:
a connection interface unit configured to couple to a host system;
a rewritable non-volatile memory module having a plurality of physical erasing units; and
a memory control circuit unit coupled to the connection interface unit and the rewritable non-volatile memory module,
wherein the memory control circuit unit is configured to read use information corresponding to the physical erasing units from the rewritable non-volatile memory module according to a received read command which is transmitted from the host system,
wherein the memory control circuit unit is further configured to write the read use information into a first physical erasing unit among the physical erasing units, and mark the first physical erasing unit with a recognizing flag according to a received write command which is transmitted from the host system in response to completion of the reading of the use information, wherein the memory control circuit unit is further configured to erase data in at least part of physical erasing units among the physical erasing units excepting the first physical erasing unit having the recognizing flag according to a received erase command which is transmitted from the host system in response to completion of the writing of the use information, wherein the memory control circuit unit is further configured to establish a memory management table according to the use information stored in the first physical erasing unit, and operate the memory storage device according to the memory management table.

13. The memory storage device of claim 12, wherein the memory control circuit unit is further configured to establish the memory management table according to the use information stored in the first physical erasing unit after erasing the data in the at least part of physical erasing units among the physical erasing units excepting the first physical erasing unit.

14. The memory storage device of claim 13, wherein the memory control circuit unit is further configured to search for a physical erasing unit not programmed with data among the physical erasing units to serve as the first physical erasing unit, wherein if the physical erasing unit not programmed with data does not exist among the physical erasing units, the memory control circuit unit is further configured to announce that the memory storage device is in a write protect state.

15. The memory storage device of claim 13, wherein the memory control circuit unit is further configured to write a firmware code from the host system into the rewritable non-volatile memory module.

16. The memory storage device of claim 12, wherein the command is an initialization command instructing to execute an initialization operation for the memory storage device, wherein the memory control circuit unit is further configured to establish a logical address-physical address mapping table according to the use information stored in the first physical erasing unit in response to the initialization command.

17. The memory storage device of claim 12, wherein if the memory control circuit unit determines to use the use information stored in the first physical erasing unit, the memory control circuit unit is further configured to establish the memory management table according to the use information stored in the first physical erasing unit, if the memory control circuit unit determines not to use the use information stored in the first physical erasing unit, the memory control circuit unit is further configured to establish a new memory management table.

18. The memory storage device of claim 12, wherein the use information comprises bad block information, wherein the memory control circuit unit is further configured to establish a bad block management table according to the bad block information.

19. The memory storage device of claim 12, wherein the use information comprises erasing count information, wherein the memory control circuit unit is further configured to calculate a service life of the rewritable non-volatile memory module according to the erasing count information and determine whether to send a warning message according to the service life, or execute a wear leveling operation of the rewritable non-volatile memory module according to the erasing count information.

20. The memory storage device of claim 12, wherein the use information comprises used time information, wherein the memory control circuit unit is further configured to calculate a service life of the rewritable non-volatile memory module according to the used time information, or execute a data updating operation of the rewritable non-volatile memory module according to the used time information.

21. The memory storage device of claim 12, wherein the use information comprises reading count information, wherein the memory control circuit unit is further configured to determine a read count of at least one physical programming unit according to the reading count information, and execute a data updating operation for a physical erasing unit to which the at least one physical programming unit belongs if the read count of the at least one physical programming unit reaches a read count threshold.

22. The memory storage device of claim 12, wherein the memory management table comprises a logical address-physical address mapping table, an erasing count management table, a used time management table and a reading count management table, wherein the memory control circuit unit is further configured to access the physical erasing units according to the logical address-physical address mapping table, calculate a service life of the rewritable non-volatile memory module and execute a wear leveling operation of the rewritable non-volatile memory module according to the erasing count management table and the used time management table, and execute a data updating operation of the rewritable non-volatile memory module according to the used time management table and the reading count management table.

23. A memory management system, comprising:
a host system;
a memory storage device, comprising:
a connection interface unit, is configured to couple to the host system;
a rewritable non-volatile memory module, having a plurality of physical erasing units; and
a memory control circuit unit, coupled to the connection interface unit and the rewritable non-volatile memory module,
wherein the host system includes a memory management unit, which is implemented by program codes, and is configured to transmit command to the memory storage device,
wherein the memory management unit is configured to transmit a read command to the memory storage device, and the memory control circuit unit is configured to read use information corresponding to the physical erasing units from the rewritable non-volatile memory module according to the read command in response to the read command,
wherein the memory management unit is configured to transmit a write command to the memory storage device in response to completion of the reading of the use information, and the memory control circuit unit is further configured to write the read use information into a first physical erasing unit among the physical erasing units and mark the first physical erasing unit with a recognizing flag according to the write command in response to the write command,
wherein the memory management unit is further configured to transmit an erase command to the memory storage device in response to completion of the writing of the use information, and the memory control circuit unit is further configured to erase data in at least part of physical erasing units among the physical erasing units excepting the first physical erasing unit having the recognizing flag according to the erase command, wherein the memory management unit is further configured to transmit a create-table command to the memory storage device, and the memory control circuit unit is further configured to establish a memory management table according to the create-table command and the use information stored in the first physical erasing unit, and operate the memory storage device according to the memory management table.

24. The memory management system of claim 23, wherein the memory management unit is further configured to transmit the create-table command to the memory storage device after the memory control circuit unit erases the data in the at least part of physical erasing units among the physical erasing units excepting the first physical erasing unit.

25. The memory management system of claim 24, wherein the memory control circuit unit is further configured to search for a physical erasing unit not programmed with data among the physical erasing units to serve as the first physical erasing unit according to the write command, wherein if the physical erasing unit not programmed with data does not exist among the physical erasing units, the memory control circuit unit is further configured to transmit a first error message to the host system in response to the write command, wherein the memory management unit is further configured to transmit a write protect command to the memory storage device according to the first error message, and the memory control circuit unit is further configured to announce that the memory storage device is in a write protect state according to the write protect command in response to the write protect command.

26. The memory management system of claim 24, wherein the memory management unit is further configured to transmit an update firmware code command to the memory storage device, and the memory control circuit unit is further configured to write a firmware code from the host system into the rewritable non-volatile memory module according to the update firmware code command.

27. The memory management system of claim 23, wherein the memory control circuit unit is further configured to determine whether the create-table command received from the host system instructs to use the use information stored in the first physical erasing unit, wherein if the memory control circuit unit determines that the create-table command instructs to use the use information stored in the first physical erasing unit, the memory control circuit unit is further configured to establish the memory management table according to the use information stored in the first physical erasing unit, if the memory control circuit unit determines that the create-table command instructs not to use the use information stored in the first physical erasing unit, the memory control circuit unit is further configured to establish a new memory management table.

28. The memory management system of claim 23, wherein the use information comprises bad block information, wherein the memory control circuit unit is further configured to establish a bad block management table according to the bad block information.

29. The memory management system of claim 23, wherein the use information comprises erasing count information, wherein the memory control circuit unit is further configured to calculate a service life of the rewritable non-volatile memory module according to the erasing count information and determine whether to send a warning message according to the service life, or executes a wear leveling operation of the rewritable non-volatile memory module according to the erasing count information.

30. The memory management system of claim 23, wherein the use information comprises used time information, wherein the memory control circuit unit is further configured to calculate a service life of the rewritable non-volatile memory module according to the used time information, or execute a data updating operation of the rewritable non-volatile memory module according to the used time information.

31. The memory management system of claim 23, wherein the use information comprises reading count information, wherein the memory control circuit unit is further configured to determine a read count of at least one physical programming unit according to the reading count information, and execute a data updating operation for a physical erasing unit to which the at least one physical programming unit belongs if the read count of the at least one physical programming unit reaches a read count threshold.

32. The memory management system of claim 23, wherein the memory management table comprises a logical address-physical address mapping table, an erasing count management table, a used time management table and a reading count management table, wherein the memory control circuit unit is further configured to access the physical erasing units according to the logical address-physical address mapping table, calculate a service life of the rewritable non-volatile memory module and execute a wear leveling operation of the rewritable non-volatile memory module according to the erasing count management table and the used time management table, and execute a data updating operation of the rewritable non-volatile memory module according to the used time management table and the reading count management table.

* * * * *